(12) United States Patent
Urano et al.

(10) Patent No.: US 10,654,345 B2
(45) Date of Patent: May 19, 2020

(54) OPENING/CLOSING APPARATUS FOR VEHICLE

(71) Applicant: MITSUBA Corporation, Gunma (JP)

(72) Inventors: Yoshitaka Urano, Gunma (JP); Yoshitaka Sekine, Gunma (JP); Takashi Ono, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 15/992,199

(22) Filed: May 30, 2018

(65) Prior Publication Data

US 2018/0345766 A1 Dec. 6, 2018

(30) Foreign Application Priority Data

May 31, 2017 (JP) .................. 2017-107878

(51) Int. Cl.
| | |
|---|---|
| B60J 5/06 | (2006.01) |
| E05D 15/10 | (2006.01) |
| E05F 15/655 | (2015.01) |
| E05F 15/646 | (2015.01) |
| B60J 5/04 | (2006.01) |

(52) U.S. Cl.
CPC .............. *B60J 5/06* (2013.01); *E05D 15/101* (2013.01); *E05F 15/646* (2015.01); *E05F 15/655* (2015.01); *B60J 5/049* (2013.01); *E05D 15/1047* (2013.01); *E05Y 2201/66* (2013.01); *E05Y 2201/684* (2013.01); *E05Y 2900/531* (2013.01)

(58) Field of Classification Search
CPC .. B60J 5/06; B60J 5/049; E05F 15/655; E05F 15/646; E05D 15/101; E05D 15/1047; E05Y 2900/531; E05Y 2201/684; E05Y 2201/66

USPC ......................................................... 296/155
See application file for complete search history.

(56) References Cited

U.S. PATENT DOCUMENTS

| | | | | |
|---|---|---|---|---|
| 6,152,519 | A * | 11/2000 | Blank ................... | E05F 15/646 296/155 |
| 7,325,361 | B2 * | 2/2008 | Rogers, Jr. ............ | E05F 15/643 296/155 |
| 2006/0201840 | A1 * | 9/2006 | Utaki ...................... | F16G 13/16 206/389 |

FOREIGN PATENT DOCUMENTS

| | | | | |
|---|---|---|---|---|
| JP | 3543204 | | 7/2004 | |
| JP | 2007-186928 | | 7/2007 | |
| JP | 2009235704 | | 10/2009 | |
| JP | 5225917 | | 7/2013 | |
| JP | 2014163066 | A * | 9/2014 | ................ B60J 5/06 |

OTHER PUBLICATIONS

"Office Action of China Counterpart Application," with English translation thereof, dated Dec. 3, 2019, p. 1-10.

* cited by examiner

*Primary Examiner* — Pinel E Romain
(74) *Attorney, Agent, or Firm* — JCIPRNET

(57) ABSTRACT

Provided is an opening/closing apparatus for a vehicle capable of protecting a cable configured to open and close an opening/closing body even when a large external force is applied to the opening/closing body. A cross-sectional shape of a cable holding groove in a direction crossing a longitudinal direction of a cable guide is an arc shape configured to be in surface contact with a closing-side cable and an opening-side cable. Accordingly, a pressing force applied to the closing-side cable and the opening-side cable can be dispersed in a wide range of the closing-side cable and the opening-side cable rather than only in one part.

8 Claims, 9 Drawing Sheets

OPENING/CLOSING APPARATUS FOR VEHICLE

CROSS-REFERENCE TO RELATED APPLICATION

This application claims the priority benefit of Japan application serial no. 2017-107878, filed on May 31, 2017. The entirety of the above-mentioned patent application is hereby incorporated by reference herein and made a part of this specification.

BACKGROUND

Technical Field

The present disclosure relates to an opening/closing apparatus for a vehicle configured to open/close an opening/closing body.

Description of Related Art

A relatively large opening section is installed in a side portion of a vehicle such as a station wagon or the like, and the opening section can be freely opened and closed by a sliding door (an opening/closing body) that moves in a forward/rearward direction of the vehicle. For example, Patent Document 1 discloses an opening/closing apparatus for a vehicle in which a sliding door is automatically opened and closed by driving of a driving apparatus.

In the opening/closing apparatus for a vehicle (the sliding door apparatus for a vehicle) disclosed in Patent Document 1, a driving apparatus (a motor driving apparatus) is mounted in the sliding door, and a first cable and a second cable enter and exit from the driving apparatus. Then, a tip of the first cable is attached to a front end of a cable guide, and a tip of the second cable is attached to a rear end of the cable guide.

The first cable and the second cable are pulled out to the side portion of the vehicle body from the inside of the sliding door via a pulley (a guide pulley), the first cable is routed toward a front side of the vehicle body, and the second cable is routed toward a rear side of the vehicle body. In addition, the first cable and the second cable allocated on front and rear sides along the side portion of the vehicle body are supported by the cable guide attached to the side portion of the vehicle body.

Then, the sliding door is moved to close the opening section by driving the driving apparatus to wind the first cable and let out the second cable. Meanwhile, the sliding door is moved to open the opening section by driving the driving apparatus to wind the second cable and let out the first cable.

[Patent Document 1] Japanese Patent Laid-open Publication No. 2007-186928

However, in the opening/closing apparatus for a vehicle disclosed in Patent Document 1, for example, in a state in which the sliding door is stopped at an intermediate position (between the fully open position and the fully closed position), when a user intends to open the sliding door with a strong force, the first cable having a cross section formed in a substantially circular shape is strongly pressed against a flat surface of the cable guide. In particular, a front end side of the cable guide is curved in a passenger compartment, and a large load is locally applied to the first cable in the curved portion. Accordingly, a so-called "irregular shape" may occur due to deformation of a cross section of the first cable into an elliptical shape. Accordingly, cracks or the like occur in a resin envelope formed on a surface of the first cable and the envelope is exfoliated, and thus problems such as necessity of early maintenance or the like may occur.

SUMMARY

One of the embodiments of the present disclosure is to provide an opening/closing apparatus for a vehicle capable of protecting a cable configured to open and close an opening/closing body even when a large external force is applied to the opening/closing body.

In one of the embodiments of the present disclosure, there is provided an opening/closing apparatus for a vehicle configured to open and close an opening/closing body, the opening/closing apparatus for a vehicle including: a guide rail configured to movably support the opening/closing body; a driving apparatus installed on the opening/closing body; a cable guide installed along the guide rail; a first cable wound or let out by the driving apparatus and having a tip fixed to one side of the cable guide in a longitudinal direction of the cable guide; a second cable wound or let out by the driving apparatus and having a tip fixed to the other side of the cable guide in the longitudinal direction of the cable guide; and a cable holding groove configured in the cable guide and configured to hold the first cable and the second cable, wherein a cross-sectional shape of the cable holding groove in a direction crossing the longitudinal direction of the cable guide is an arc shape configured to be in surface contact with the first cable and the second cable.

In one of the embodiments of the present disclosure, the cable holding groove is recessed toward an inside of a passenger compartment.

In one of the embodiments of the present disclosure, the cable guide is formed of a resin.

In one of the embodiments of the present disclosure, the cable guide includes at least two split bodies divided in the longitudinal direction of the cable guide, and a movement allowing section configured to allow approaching movement and separating movement is inserted therebetween.

In one of the embodiments of the present disclosure, among the split bodies that form the cable guide, the split bodies on both sides of the cable guide in the longitudinal direction of the cable guide are respectively fixed to the vehicle body.

In one of the embodiments of the present disclosure, an elastic member is installed between the split bodies that adjacent to each other.

DESCRIPTION OF THE EMBODIMENTS

According to one of the embodiments of the present disclosure, since the cross-sectional shape of the cable holding groove in the direction crossing the longitudinal direction of the cable guide is the arc shape configured to be in surface contact with the first cable and the second cable, a load applied to the first cable and the second cable can be dispersed in a wide range of the first cable and the second cable rather than only in one part. Accordingly, even when a large external force is applied to the opening/closing body, the first cable and the second cable configured to open and close the opening/closing body can be protected. Accordingly, a maintenance period of the opening/closing apparatus for a vehicle can be extended, and durability and reliability can be improved.

Hereinafter, Embodiment 1 of the present disclosure will be described in detail with reference to the accompanying drawings.

Figure 1:
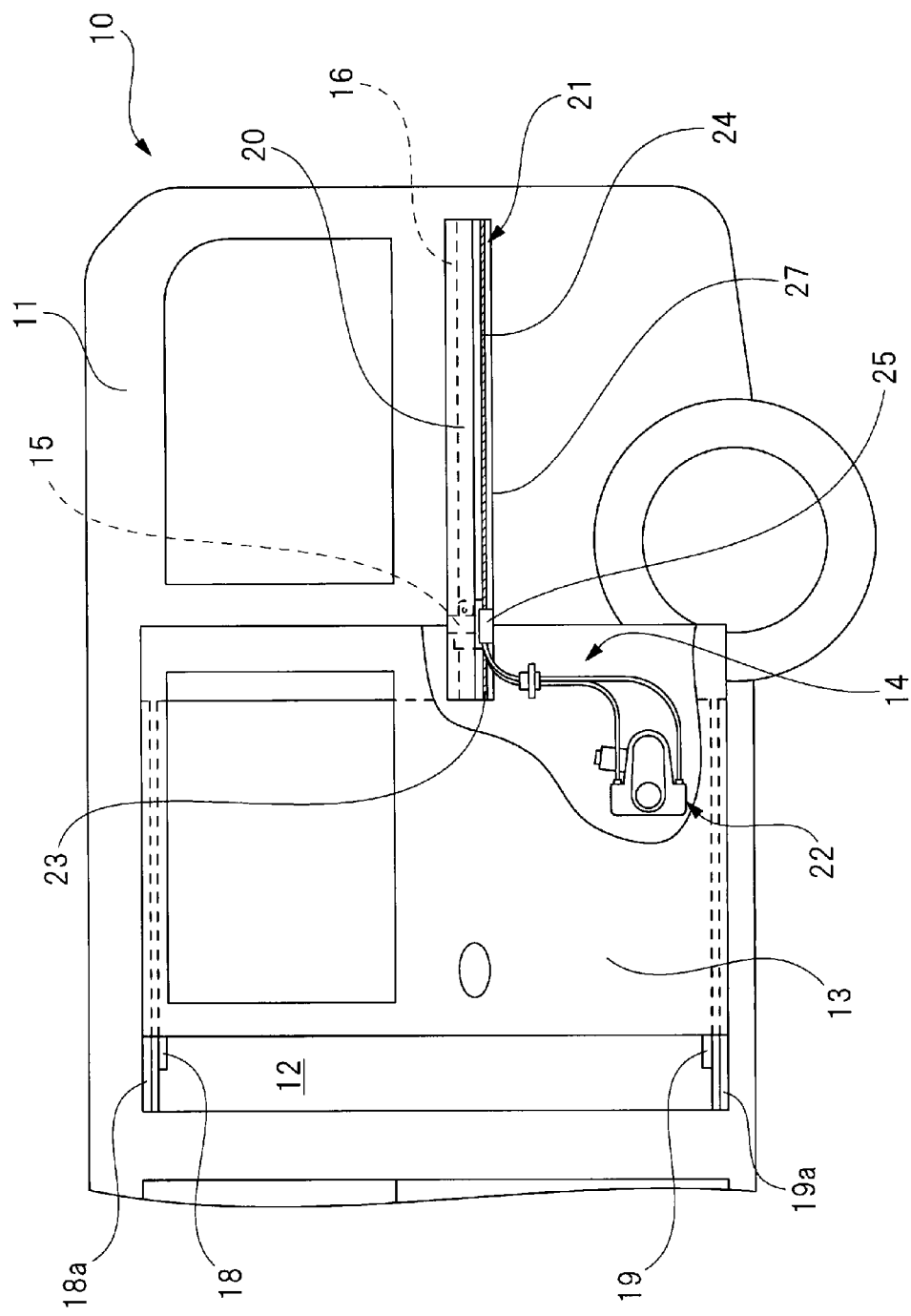
FIG. 1 is a side view of a vehicle including an opening/closing apparatus for a vehicle according to the present disclosure.
Figure 2:
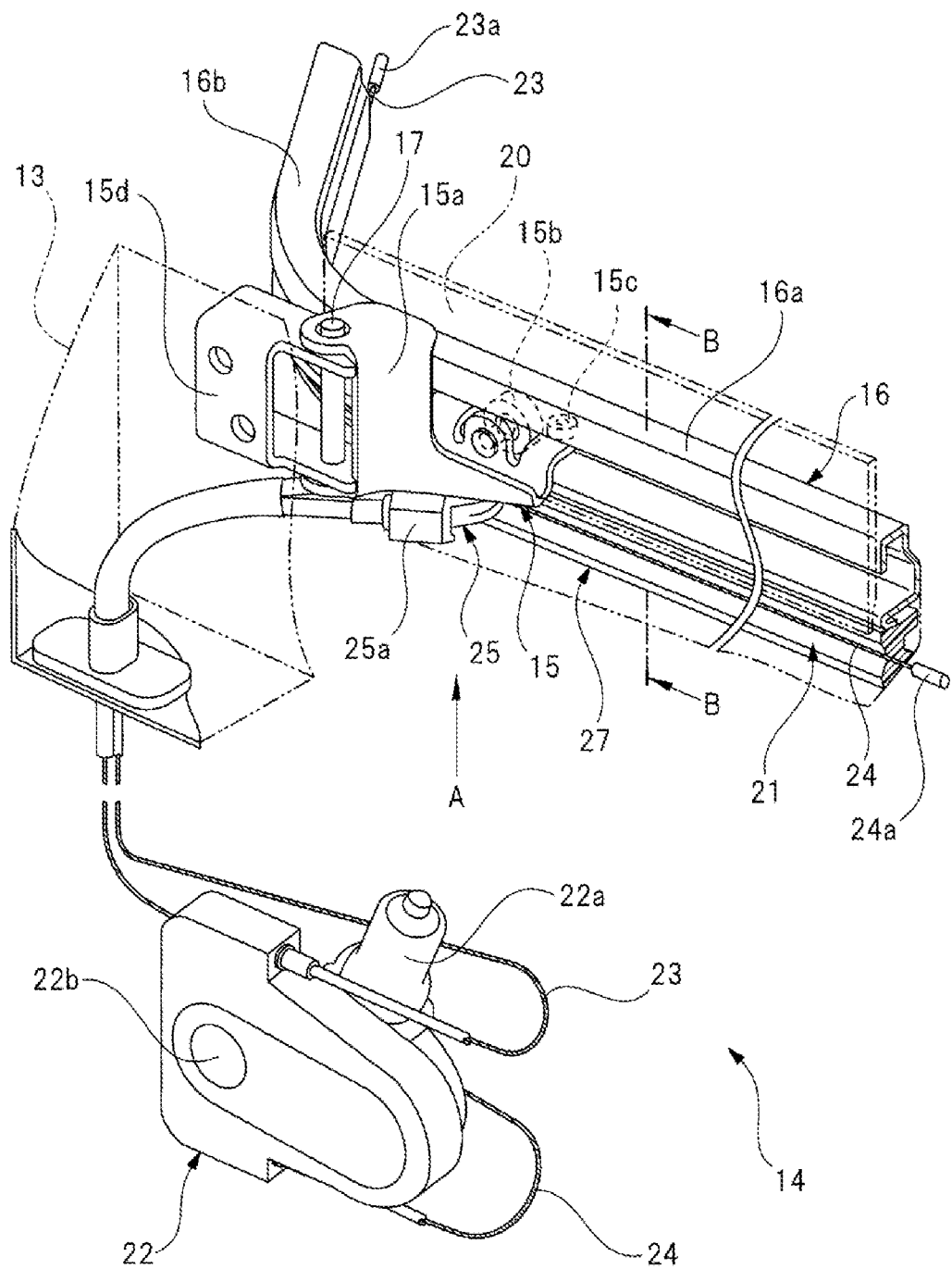
FIG. 2 is a perspective view showing the opening/closing apparatus for a vehicle of FIG. 1.
Figure 3:
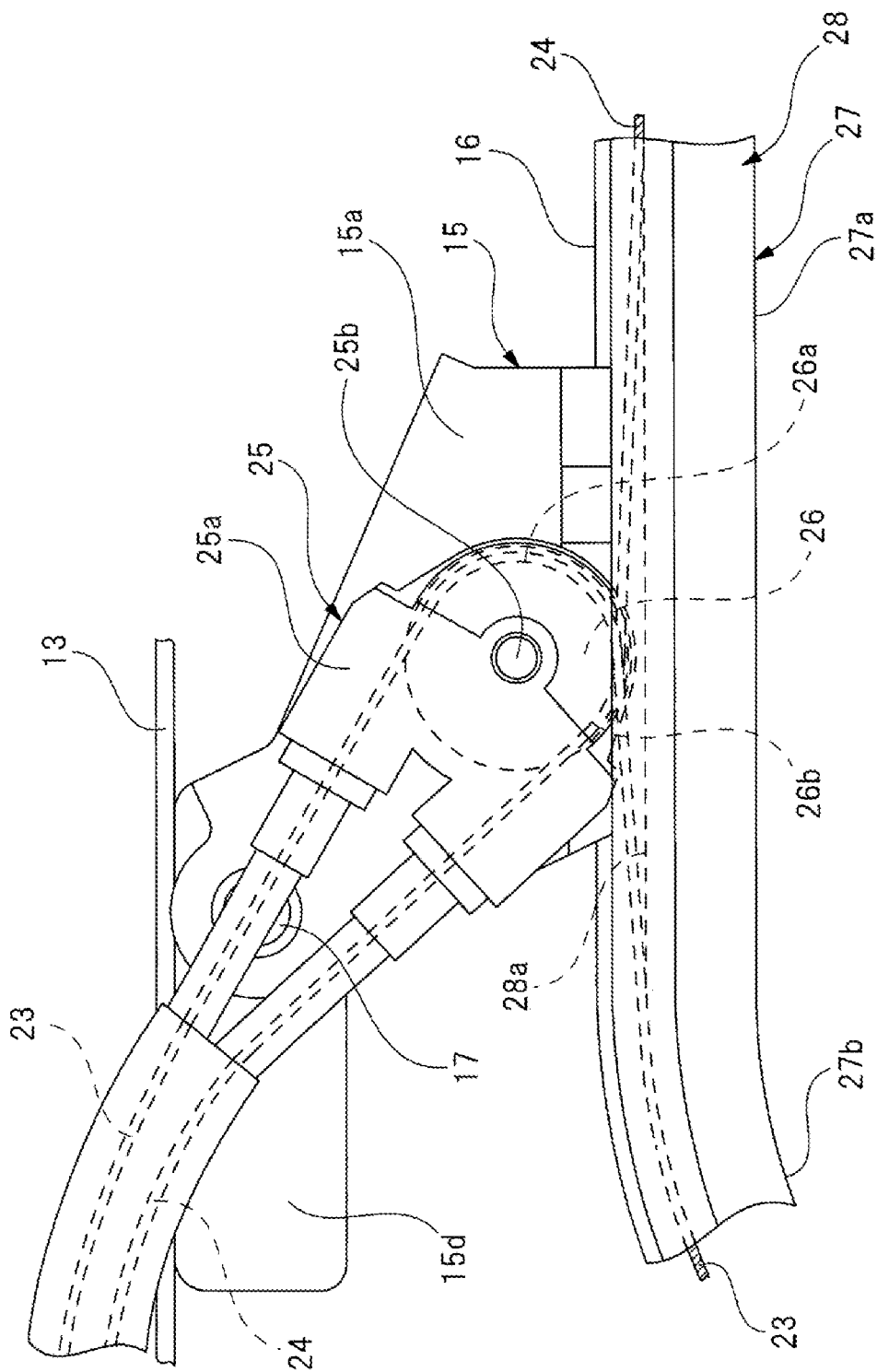
FIG. 3 is a view taken along an arrow A in FIG. 2.
Figure 4:
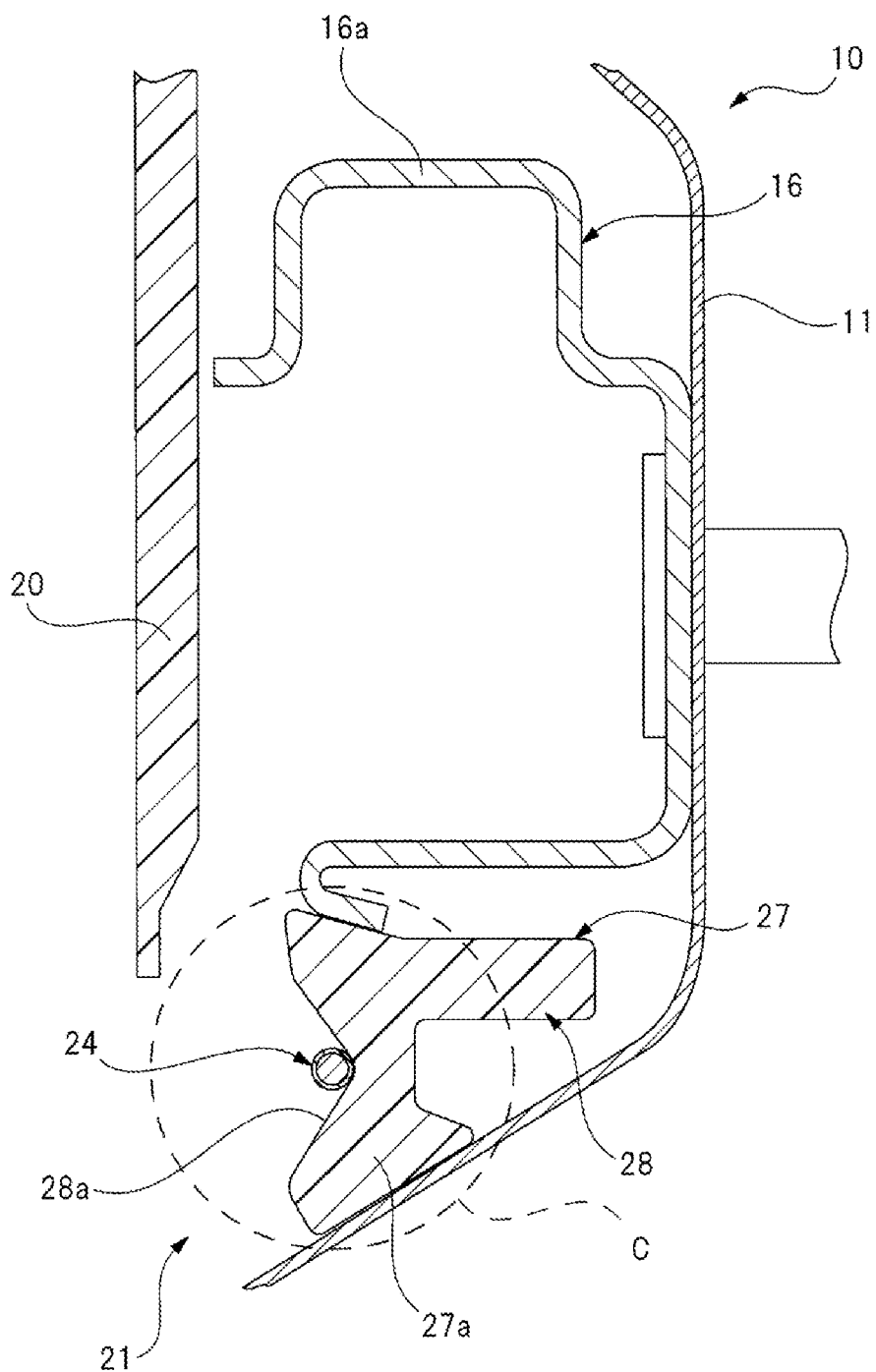
FIG. 4 is a cross-sectional view taken along line B-B in FIG. 2.
Figure 5:
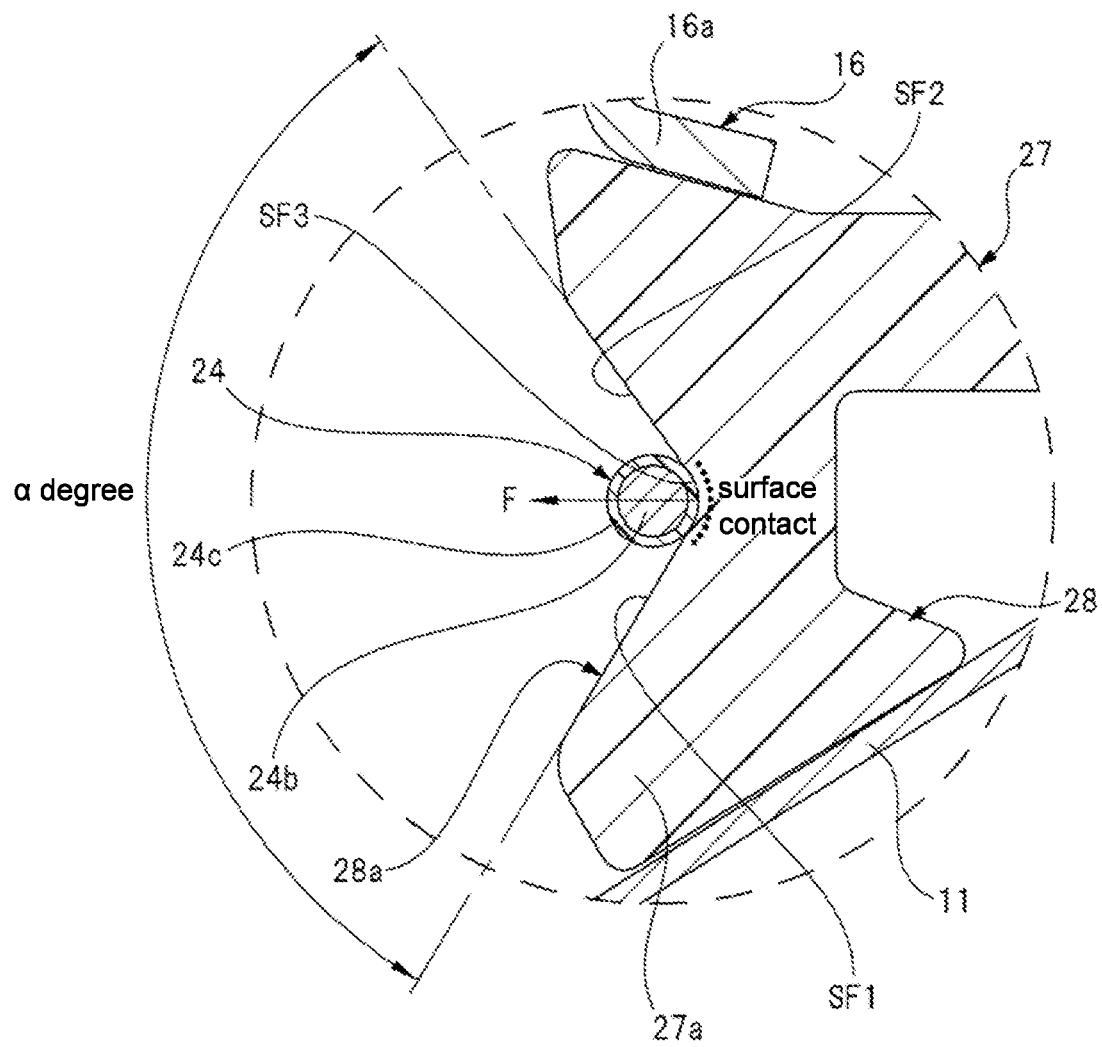
FIG. 5 is an enlarged view of a portion of a broken line circle C in FIG. 4.
Figure 6:
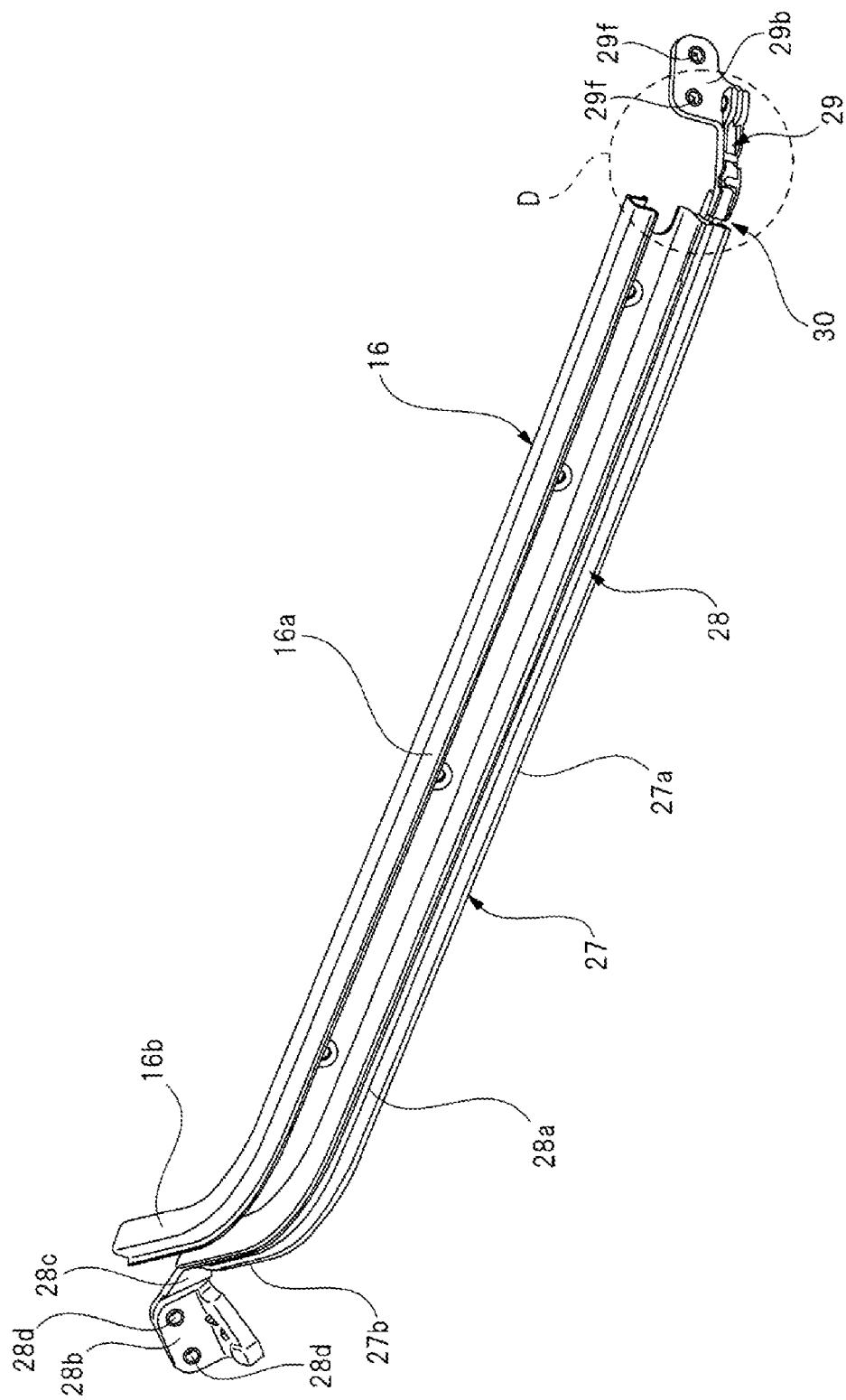
FIG. 6 is a perspective view for explaining a detailed structure of a cable guide.
Figure 7:
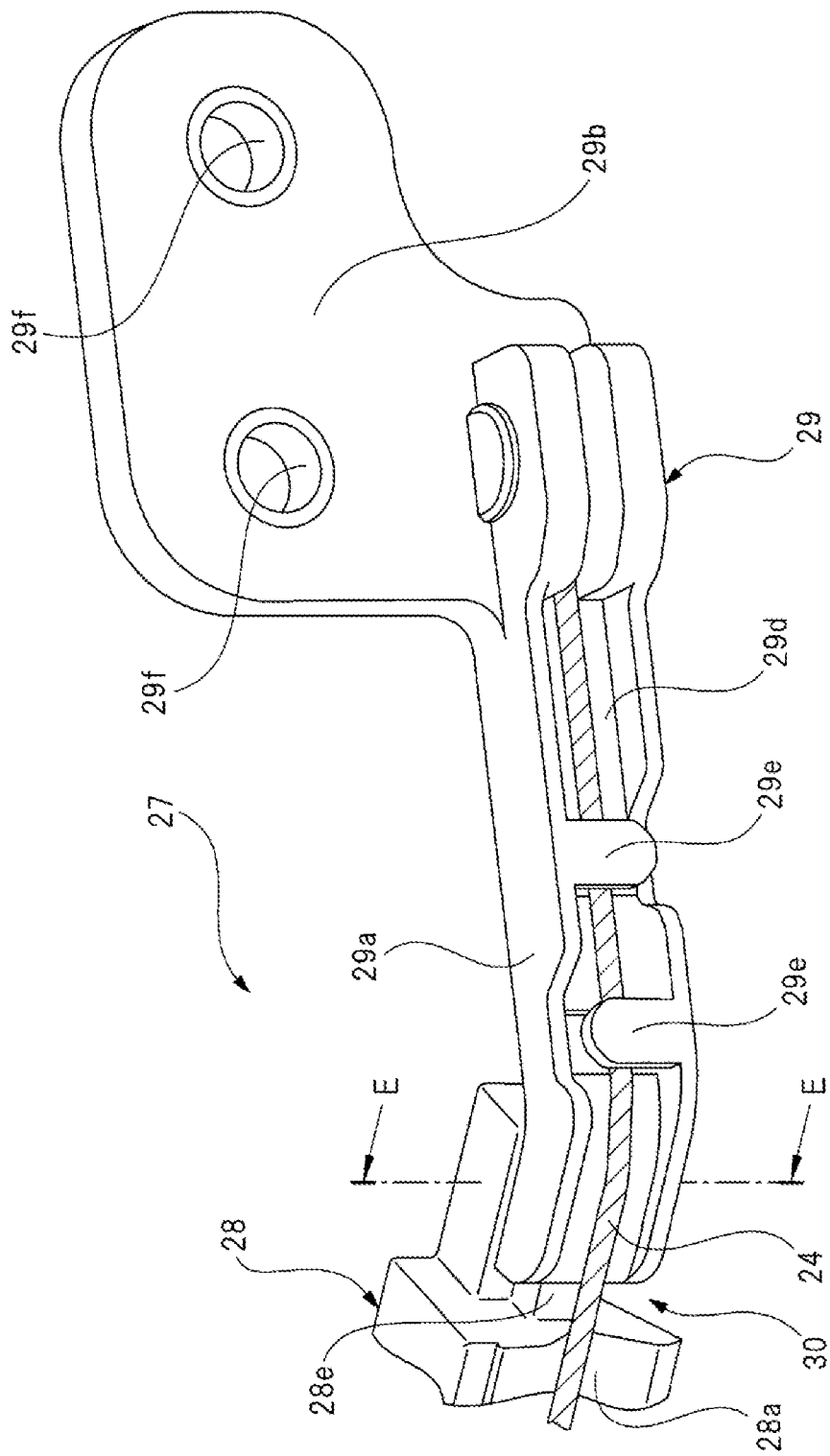
FIG. 7 is an enlarged view of a portion of a broken line circle D in FIG. 6.
Figure 8:
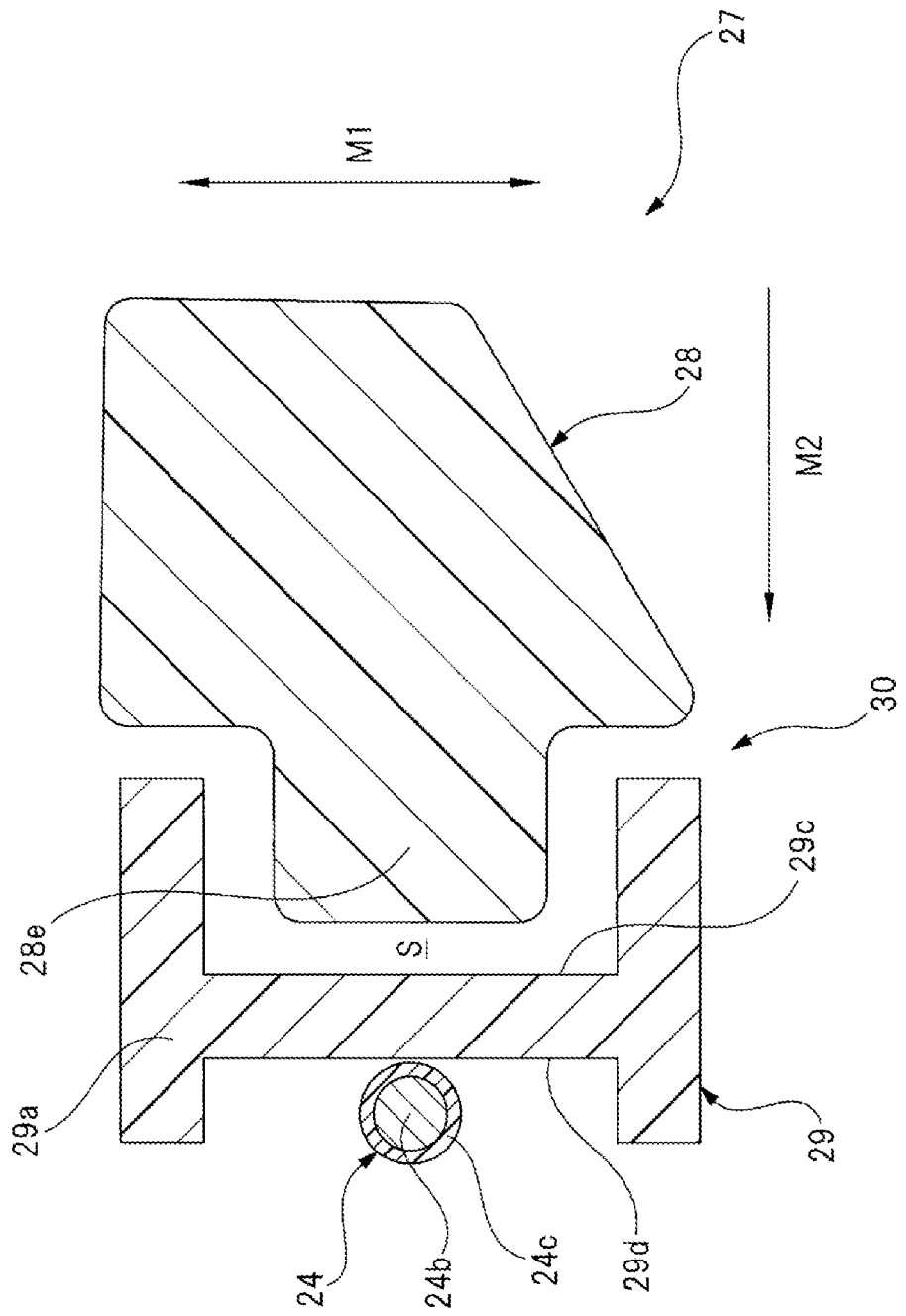
FIG. 8 is a cross-sectional view taken along line E-E in FIG. 7.

FIG. 1 is a side view of a vehicle including an opening/closing apparatus for a vehicle according to the present disclosure, FIG. 2 is a perspective view showing the opening/closing apparatus for a vehicle of FIG. 1, FIG. 3 is a view taken along an arrow A in FIG. 2, FIG. 4 is a cross-sectional view taken along line B-B in FIG. 2, FIG. 5 is an enlarged view of a portion of a broken line circle C in FIG. 4, FIG. 6 is a perspective view for explaining a detailed structure of a cable guide, FIG. 7 is an enlarged view of a portion of a broken line circle D in FIG. 6, and FIG. 8 is a cross-sectional view taken along line E-E in FIG. 7.

A vehicle 10 shown in FIG. 1 is a so-called one-box type passenger car. The vehicle 10 includes a vehicle body 11, and a large opening section 12 through which an occupant or the like can easily get in and out is formed in a side portion of the vehicle body 11. The opening section 12 is freely opened and closed by a sliding door (an opening/closing body) 13 moved in a forward/rearward direction (a leftward/rightward direction in the drawings) of the vehicle 10.

The sliding door 13 is moved by driving of an opening/closing apparatus 14 for a vehicle. That is, the opening/closing apparatus 14 for a vehicle is configured to open and close the sliding door 13. The opening/closing apparatus 14 for a vehicle includes a roller unit 15, and the roller unit 15 is disposed on an end portion of the sliding door 13 on a rear side (a right side in the drawings) of the vehicle and a substantially intermediate portion in the upward/downward direction. Meanwhile, a center rail (a guide rail) 16 is fixed to the vehicle on a rear side of the opening section 12 of the vehicle body 11 and a substantially intermediate portion in the upward/downward direction.

As shown in FIG. 2, the roller unit 15 includes a main body bracket 15a. A traveling roller 15b and a guide roller 15c are rotatably installed on the main body bracket 15a. The main body bracket 15a is swingably supported with respect to a support bracket 15d fixed to the sliding door 13 via a support shaft 17. An axial direction of the support shaft 17 coincides with an upward/downward direction of the vehicle 10, and thus the roller unit 15 is swingable about the support shaft 17 with respect to the sliding door 13 in a horizontal direction.

The center rail 16 is formed in a rod shape having a cross section in substantially a U shape by pressing a stainless steel plate or the like. The center rail 16 includes a straight section 16a straightly extending in the forward/rearward direction of the vehicle 10, and a curved section 16b curved toward the inside of the passenger compartment from a front end of the straight section 16a. Then, since the traveling roller 15b travels on the center rail 16 and the guide roller 15c is guided by the center rail 16, the roller unit 15 moves along the center rail 16.

As the roller unit 15 moves along the center rail 16, the sliding door 13 is moved along the side portion of the vehicle body 11 in the forward/rearward direction of the vehicle 10, and the opening section 12 is opened and closed. Here, as the roller unit 15 is guided to the curved section 16b from the straight section 16a of the center rail 16, the sliding door 13 is pulled into the passenger compartment to be flush with a side surface of the vehicle body 11, and the opening section 12 is closed.

Further, as shown in FIG. 1, roller units 18 and 19 are installed on upper and lower portions of the sliding door 13 on a front side (a left side in the drawings) of the vehicle. In addition, an upper rail 18a and a lower rail 19a are fixed to upper and lower portions of the opening section 12 of the vehicle body 11. Further, the pair of roller units 18 and 19 are movable with respect to the upper rail 18a and the lower rail 19a, respectively.

In this way, the sliding door 13 is movably supported in a stable state at three points of the center rail 16, the upper rail 18a and the lower rail 19a with respect to the vehicle body 11.

As shown in FIG. 1, a rail cover 20 configured to cover the outside of the center rail 16 is mounted on the side portion of the vehicle body 11. The rail cover 20 is formed of a resin material such as plastic or the like having the same color as the vehicle body 11 in an elongated plate shape. Accordingly, the center rail 16 is hidden and appearance of the vehicle 10 is improved. However, a portion of the roller unit 15 of which a closing-side cable (a first cable) 23 and an opening-side cable (a second cable) 24 are pulled out is disposed at a portion of a gap 21 between the rail cover 20 and the vehicle body 11, and moved along the gap 21.

As shown in FIG. 2, the opening/closing apparatus 14 for a vehicle includes a driving apparatus 22. The driving apparatus 22 includes an electric motor 22a installed in the sliding door 13 and including an armature shaft (not shown) rotated reciprocally, and a drum section 22b configured to accommodate a drum (not shown) rotated reciprocally by the electric motor 22a. Further, a base end side of the closing-side cable 23 and a base end side of the opening-side cable 24 are wound on the drum. Specifically, the base end sides of the cables 23 and 24 are wound such that the opening-side cable 24 is let out when the closing-side cable 23 is wound and the closing-side cable 23 is let out when the opening-side cable 24 is wound.

Accordingly, as the electric motor 22a is rotated reciprocally, the cables 23 and 24 are driven (moved) in opposite directions. That is, the cables 23 and 24 are driven by the driving apparatus 22, and when the closing-side cable 23 is wound, the sliding door 13 is moved in a direction in which the opening section 12 is closed. On the other hand, when the opening-side cable 24 is wound, the sliding door 13 is moved in a direction in which the opening section 12 is opened.

As shown in FIGS. 2 and 3, the closing-side cable 23 and the opening-side cable 24 are pulled out to the vicinity of the roller unit 15 via a pulley unit 25. Then, a tip side of the closing-side cable 23 is routed at a front side of the vehicle body 11 and a tip side of the opening-side cable 24 is routed at a rear side of the vehicle body 11 by the pulley unit 25.

That is, the pulley unit 25 has a function of allocating the tip sides of the closing-side cable 23 and the opening-side cable 24 to front and rear sides of the vehicle body 11, respectively.

The pulley unit 25 includes a pulley case 25a, and a pulley 26 is rotatably accommodated in the pulley case 25a. A pulley shaft 25b is installed in the pulley case 25a to extend in the upward/downward direction of the vehicle body 11 and pass through the pulley case 25a. Further, the pulley shaft 25b also rotatably supports the pulley case 25a while rotatably supporting the pulley 26.

The pulley shaft 25b is parallel to the support shaft 17 that supports the roller unit 15. Then, an end portion of the pulley shaft 25b on an upper side of the vehicle body 11 is fixed to the main body bracket 15a while protruding from the pulley case 25a. Accordingly, the pulley unit 25 is pivotably supported by the pulley shaft 25b and swingable with respect to the roller unit 15.

As shown in FIG. 3, a portion of the pulley 26 outside in the radial direction, i.e., a portion at which the closing-side cable 23 and the opening-side cable 24 are pulled out, is opposite to a cable holding groove 28a of a cable guide 27 disposed immediately below the center rail 16. Further, the pulley 26 includes a closing-side pulley groove 26a that holds the closing-side cable 23 and an opening-side pulley groove 26b that holds the opening-side cable 24, and the pulley grooves 26a and 26b are installed in parallel to an axial direction of the pulley 26.

Further, the tip side of the closing-side cable 23 pulled out of the closing-side pulley groove 26a is held by the cable holding groove 28a on a front side of the cable guide 27 in the longitudinal direction. Meanwhile, the tip side of the opening-side cable 24 pulled out of the opening-side pulley groove 26b is held by the cable holding groove 28a on a rear side of the cable guide 27 in the longitudinal direction.

Here, as shown in FIG. 2, a closing-side locking piece 23a is fixed to the tip of the closing-side cable 23. The closing-side locking piece 23a is locked to a front-side vehicle body fixing section 28b (see FIG. 6) installed at a front side of the cable guide 27 in the longitudinal direction. Meanwhile, an opening-side locking piece 24a is fixed to the tip of the opening-side cable 24. The opening-side locking piece 24a is locked to a rear-side vehicle body fixing section 29b (see FIG. 6) installed on a rear side of the cable guide 27 in the longitudinal direction. That is, the tip of the closing-side cable 23 is fixed to one side (a front side) of the cable guide 27 in a longitudinal direction, and the tip of the opening-side cable 24 is fixed to the other side (a rear side) of the cable guide 27 in the longitudinal direction.

As shown in FIG. 1, the cable guide 27 configured to hold the closing-side cable 23 and the opening-side cable 24 is mounted on the side portion of the vehicle body 11. The cable guide 27 is exposed to the outside from the gap 21 between the rail cover 20 and the vehicle body 11. Accordingly, in order to improve the appearance of the vehicle 10, the cable guide 27 is formed of a resin material (for example, PBT resin or the like) such as plastic or the like having the same color as the vehicle body 11.

The cable guide 27 is installed along the center rail 16 and disposed immediately under the center rail 16. That is, as shown in FIG. 6, in the cable guide 27, like the center rail 16, a straight section 27a straightly extending in the forward/rearward direction of the vehicle 10 and a curved section 27b curved toward the inside of passenger compartment from the front end of the straight section 27a are provided.

Further, in FIG. 6, in order for the shapes of the center rail 16 and the cable guide 27 to be easily understandable, only the center rail 16 and the cable guide 27 are described. Here, as shown in FIG. 1, the opening/closing apparatus 14 for a vehicle is constituted by the center rail 16, the cable guide 27, the driving apparatus 22, the closing-side cable 23, the opening-side cable 24 and the pulley unit 25.

More specifically, as shown in FIGS. 6 and 7, the cable guide 27 is formed in a rod shape by connecting a first split body (a split body) 28 and a second split body (a split body) 29 to each other. A connecting section of the first split body 28 and the second split body 29 is installed at a position at which they overlap each other in the forward/rearward direction and the widthwise direction of the vehicle 10. The first split body 28 occupies the majority of a front side (a left side in the drawings) of the cable guide 27 in the longitudinal direction, and the cable holding groove 28a configured to hold the closing-side cable 23 and the opening-side cable 24 (see FIG. 3) is formed at an outer side (a front side in the drawings) of the first split body 28 opposite to the inside of the passenger compartment in a short direction.

As shown in FIGS. 4 and 5, the cable holding groove 28a is formed to have a cross-sectional shape in substantially a V shape in a direction crossing the longitudinal direction of the first split body 28. Further, an opening direction of the cable holding groove 28a is right beside the vehicle 10. Specifically, the cable holding groove 28a is formed to be recessed toward the inside (the right side in FIG. 4) of the passenger compartment, and thus the closing-side cable 23 and the opening-side cable 24 are disposed on the deepest portion of the cable holding groove 28a.

Here, as shown in FIGS. 1 and 4, the opening-side cable 24 is exposed to the outside from the gap 21 between the rail cover 20 and the vehicle body 11 and disposed in the deepest portion of the cable holding groove 28a. Accordingly, during washing or the like of the vehicle 10, an operator is prevented from touching the opening-side cable 24, and damage to the opening-side cable 24 is prevented. On the other hand, the closing-side cable 23 is not exposed to the outside because the closing-side cable 23 is hidden by the sliding door 13 regardless of an open/closed state of the sliding door 13.

In addition, as shown in FIG. 5, the opening-side cable 24 is constituted by a cable main body 24b formed by twisting a plurality of strands formed of a steel material, and a resin envelope 24c configured to cover surroundings of the cable main body 24b. Accordingly, rusting of the cable main body 24b is prevented, and the appearance from the outside is improved. For example, when the envelope 24c is the same color as the cable guide 27, the opening-side cable 24 can be inconspicuous and the appearance from the outside can be further improved. Further, in the closing-side cable 23, the same structure as the opening-side cable 24 is employed.

As shown in FIG. 5, the cable holding groove 28a is constituted by a first inclined surface SF1, a second inclined surface SF2 and an arc surface SF3. Further, an angle formed between the first inclined surface SF1 and the second inclined surface SF2 is an angle α of 90 degrees or more (=about 115 degrees). Further, the arc surface SF3 is formed between the first inclined surface SF1 and the second inclined surface SF2, and disposed on the deepest portion of the cable holding groove 28a.

Further, a radius of curvature of the arc surface SF3 and a radius dimension of the opening-side cable 24 (the closing-side cable 23) are the same. Accordingly, the opening-side cable 24 (the closing-side cable 23) and the arc surface SF3 are in "surface contact" with each other as shown by a dotted line portion in the drawings. That is, an outer circumferential portion of the opening-side cable 24 (the closing-side cable 23) comes in contact with the entire surface of the arc surface SF3. That is, a cross-sectional shape of the cable holding groove 28a in the deepest portion in a direction crossing the longitudinal direction of the first split body 28 is formed in an arc shape configured to be in surface contact with the opening-side cable 24 (the closing-side cable 23).

Here, in FIG. 5, while only the cross-sectional portion of the opening-side cable 24 is shown, in particular, the closing-side cable 23 may be strongly pressed against the cable holding groove 28a of the curved section 27b (see FIG. 6). For example, in a state in which the sliding door 13 is stopped at an intermediate position, when a user opens the sliding door 13 with a strong force, the closing-side cable 23 is strongly pressed against the cable holding groove 28a of the curved section 27b.

Here, a pressing force (a load) F (see FIG. 5) transmitted from the cable holding groove 28a of the curved section 27b is dispersed and transmitted to the outer circumferential portion of the closing-side cable 23 from the entire surface of the arc surface SF3. Accordingly, deformation of the cross section of the closing-side cable 23 to an elliptical shape is suppressed, and a so-called "irregular shape" of the closing-side cable 23 can be effectively prevented. In this way, dispersion of the pressing force F is an important element in protecting the cable (preventing exfoliation of the envelope, or the like).

As shown in FIG. 6, the front-side vehicle body fixing section 28b is formed on a front side in the longitudinal direction (a left side in the drawings) of the first split body 28 that forms the cable guide 27. The front-side vehicle body fixing section 28b is formed in substantially a plate shape, and integrally formed with a front side of the first split body 28 in the longitudinal direction via a connecting section 28c. Two bolt through-holes 28d are formed in the front-side vehicle body fixing section 28b, and the front-side vehicle body fixing section 28b is fixed to the vehicle body 11 (see FIG. 1) by two fixing bolts (not shown). That is, the first split body 28 is fixed to the vehicle body 11 by two fixing bolts, and attached to the vehicle body 11 in a so-called "cantilever" state.

Meanwhile, as shown in FIGS. 7 and 8, a guide convex section 28e extending in the longitudinal direction of the first split body 28 and protruding in a direction crossing the longitudinal direction of the first split body 28 is installed integrally with a rear side (a right side in the drawings) of the first split body 28 in the longitudinal direction. The guide convex section 28e is accommodated in a guide concave section 29c of the second split body 29. In this way, the rear side in the longitudinal direction that is a so-called "free end" of the first split body 28 is supported by the second split body 29.

As shown in FIG. 7, the second split body 29 that forms the cable guide 27 includes a rod-shaped main body section 29a formed in substantially a rod shape, and the rear-side vehicle body fixing section 29b formed in substantially a plate shape and formed integrally with a rear side (a right side in the drawings) of the rod-shaped main body section 29a in the longitudinal direction.

In addition, as shown in FIG. 8, the guide concave section 29c in which the guide convex section 28c of the first split body 28 is accommodated via a predetermined gap S is formed at a front side of the rod-shaped main body section 29a in the longitudinal direction and the inside (a right side of the drawings) of the passenger compartment. That is, the guide convex section 28e of the first split body 28 is accommodated in the guide concave section 29c of the second split body 29 with "play."

Further, a cable accommodating groove 29d configured to accommodate the opening-side cable 24 is formed on the passenger-compartment outer side (a left side in the drawings) opposite to the passenger-compartment inner side of the of the rod-shaped main body section 29a. In addition, as shown in FIG. 7, a pair of falling prevention pieces 29e configured to prevent falling of the opening-side cable 24 accommodated in the cable accommodating groove 29d are formed on the passenger-compartment outer side of the of the rod-shaped main body section 29a. Accordingly, the opening-side cable 24 is routed along the cable accommodating groove 29d.

Two bolt through-holes 29f are formed in the rear-side vehicle body fixing section 29b. Then, like the front-side vehicle body fixing section 28b, the rear-side vehicle body fixing section 29b is also fixed to the vehicle body 11 (see FIG. 1) by two fixing bolts (not shown).

In this way, each of the first split body 28 and the second split body 29 on both sides of the cable guide 27 in the longitudinal direction is fixed to the vehicle body 11 by two fixing bolts. That is, the cable guide 27 is fixed to the vehicle body 11 by a total of four fixing bolts. Accordingly, complication of a mounting operation of the cable guide 27 to the vehicle body 11 is suppressed.

In addition, a movement allowing section 30 is installed between the first split body 28 and the second split body 29. Specifically, the movement allowing section 30 is constituted by the guide convex section 28e of the first split body 28 and the guide concave section 29c of the second split body 29. Further, the movement allowing section 30 absorbs manufacturing errors of the first split body 28 and the second split body 29 as the guide convex section 28e is accommodated in the guide concave section 29c with a predetermined gap (play).

In addition, the movement allowing section 30 has a function of solving a defect due to a difference in coefficient of thermal expansion between the cable guide 27 formed of a resin and the vehicle body 11 formed of a steel plate. Specifically, even when the first split body 28 and the second split body 29 expand and contract (dimensional variation) due to heating and cooling, the movement allowing section 30 absorbs (allows) the dimensional variation. Accordingly, occurrence of cracks in the cable guide 27 or the like is effectively prevented. In this way, the movement allowing section 30 allows mutual approaching movement and separating movement of the first split body 28 and the second split body 29.

Here, the movement allowing section 30 allows relative movement of the first split body 28 and the second split body 29 even in a direction crossing the longitudinal direction of the cable guide 27 as shown by arrows M1 and M2 in FIG. 8 in addition to relative movement of the first split body 28 and the second split body 29 in the longitudinal direction of the cable guide 27. Accordingly, the movement allowing section 30 allows dimensions of the first split body 28 and the second split body 29 to be smoothly varied (thermally deformed) when the first split body 28 and the second split body 29 expand and contract due to heating and cooling.

Here, an elastic member (not shown) formed of rubber or the like can be interposed between the first split body 28 and the second split body 29. In this case, wobbling between the first split body 28 and the second split body 29 can be further suppressed, and silence of the opening/closing apparatus 14 for a vehicle (see FIG. 1) can be further improved.

As described above, according to the opening/closing apparatus 14 for a vehicle of the embodiment, since a cross-sectional shape of the cable holding groove 28a in a direction crossing the longitudinal direction of the cable guide 27 is formed in an arc shape configured to be in surface contact with the closing-side cable 23 and the opening-side cable 24, the pressing force F applied to the closing-side cable 23 and the opening-side cable 24 can also be dispersed in a wide range of the closing-side cable 23 and the opening-side cable 24 rather than only in one part.

Accordingly, even when a large external force is applied to the sliding door 13, the closing-side cable 23 and the opening-side cable 24 configured to open and close the sliding door 13 can be protected. Accordingly, a maintenance period of the opening/closing apparatus 14 for a vehicle can be extended, and durability and reliability can be improved.

In addition, according to the opening/closing apparatus 14 for a vehicle according to the embodiment, since the cable holding groove 28a is formed to be recessed toward the inside of the passenger compartment, when the vehicle 10 is washed, or the like, an operator can be prevented from touching the opening-side cable 24, and damage to the opening-side cable 24 can be prevented.

Further, according to the opening/closing apparatus 14 for a vehicle of the embodiment, since the cable guide 27 is formed of a resin, the cable guide 27 can be formed of a resin material such as plastic or the like having the same color as the vehicle body 11 without performing painting or the like on the cable guide 27. Accordingly, the cable guide 27 exposed to the outside from the gap 21 between the rail cover 20 and the vehicle body 11 can be inconspicuous, and the appearance of the vehicle 10 can be improved.

In addition, according to the opening/closing apparatus 14 for a vehicle of the embodiment, the cable guide 27 is constituted by the first split body 28 and the second split body 29 divided in the longitudinal direction, and the movement allowing section 30 configured to allow approaching movement and separating movement is installed between the first split body 28 and the second split body 29.

Accordingly, of course, a manufacturing error of the first split body 28 and the second split body 29 can be absorbed, and a defect due to a difference in coefficient of thermal expansion between the cable guide 27 formed of a resin and the vehicle body 11 formed of a steel plate, i.e., occurrence of cracks in the cable guide 27, or the like can be effectively suppressed.

Further, according to the opening/closing apparatus 14 for a vehicle of the embodiment, since the first split body 28 and the second split body 29 on both sides of the cable guide 27 in the longitudinal direction are fixed to the vehicle body 11, a mounting operation of the elongated cable guide 27 to the vehicle body 11 can be easily performed. Accordingly, assemblability of the opening/closing apparatus 14 for a vehicle to the vehicle body 11 can be improved.

Next, Embodiment 2 of the present disclosure will be described in detail with reference to the accompanying drawings. Further, portions having the same functions as in the above-mentioned Embodiment 1 are designated by the same reference numerals and detailed description thereof will be omitted.

Figure 9:
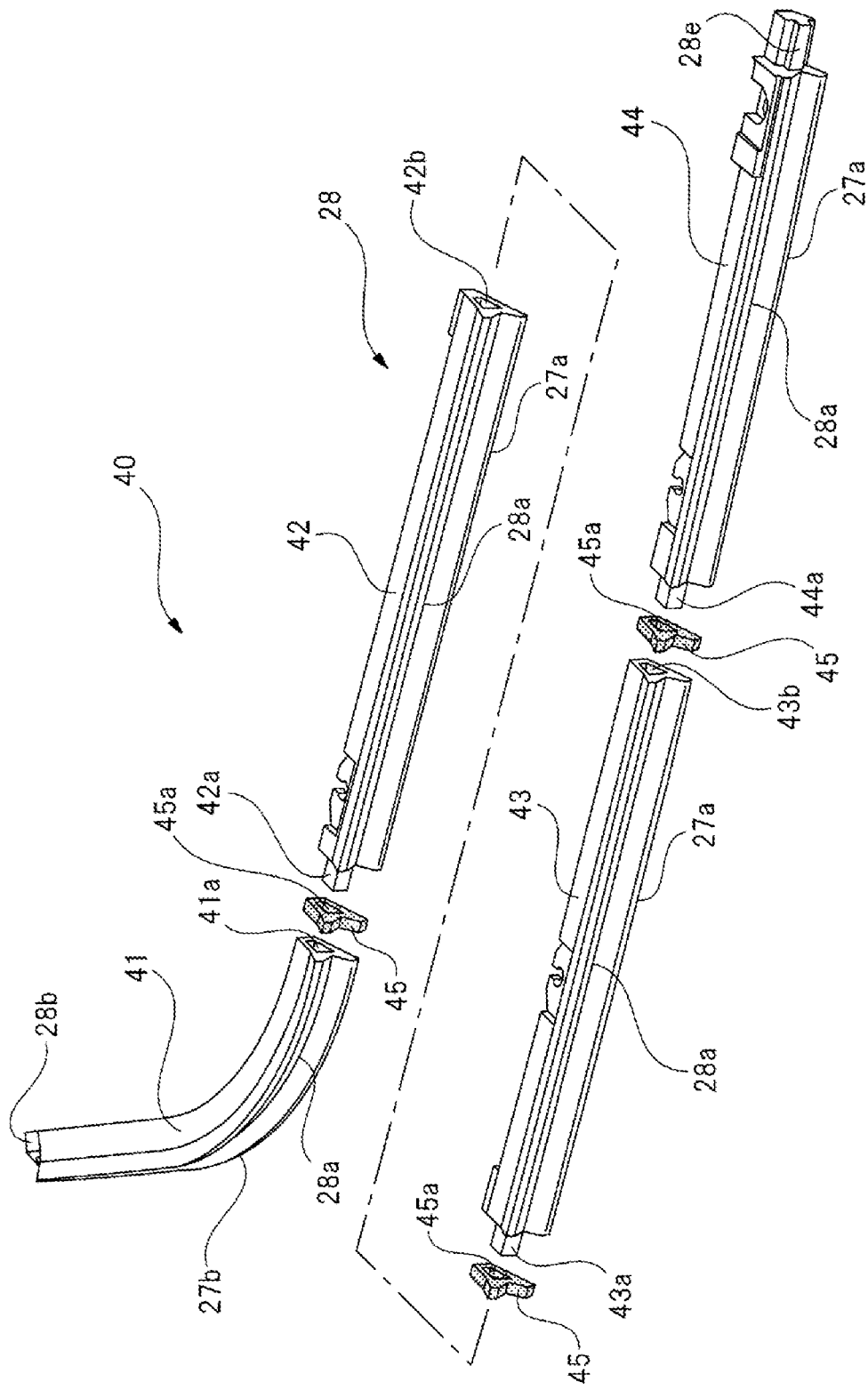
FIG. 9 is an exploded perspective view showing a cable guide according to Embodiment 2.

FIG. 9 shows an exploded perspective view showing a cable guide according to Embodiment 2.

As shown in FIG. 9, Embodiment 2 is distinguished from Embodiment 1 described above only in that a structure of a cable guide 40 is different. Specifically, Embodiment 2 is distinguished from Embodiment 1 in that the first split body 28 that forms the cable guide 40 is further divided into four split bodies, and the cable guide 40 is constituted by a total of five split bodies including the second split body 29 (see FIG. 7).

The first split body 28 that forms the cable guide 40 is formed by connecting an arc-shaped split body (a split body) 41, a first linear split body (a split body) 42, a second linear split body (a split body) 43 and a third linear split body (a split body) 44 from a front side in the longitudinal direction (one side in the longitudinal direction).

Then, a connecting concave section 41a is formed on a rear side in the longitudinal direction (the other side in the longitudinal direction) of the arc-shaped split body 41, and a connecting convex section 42a on a front side of the first linear split body 42 in the longitudinal direction is inserted into the connecting concave section 41a in a loose-fit state. In addition, a connecting concave section 42b is formed in the first linear split body 42 on a rear side in the longitudinal direction, and a connecting convex section 43a of the second linear split body 43 on a front side in the longitudinal direction is inserted into the connecting concave section 42b in a loose-fit state. Further, a connecting concave section 43b is formed in the second linear split body 43 on a rear side in the longitudinal direction, and a connecting convex section 44a of the third linear split body 44 on a front side in the longitudinal direction is inserted into the connecting concave section 43b in a loose-fit state.

Here, the arc-shaped split body 41 forms the curved section 27b, and the first linear split body 42, the second linear split body 43 and the third linear split body 44 form the straight section 27a.

Then, cushion members (elastic members) 45 formed of an elastic material such as rubber or the like are formed between the arc-shaped split body 41, the first linear split body 42, the second linear split body 43 and the third linear split body 44, which are adjacent to each other, at half-tone dot meshing portions shown in the drawing. Further, through-holes 45a through which the connecting convex section 42a, the connecting convex section 43a and the connecting convex section 44a pass are formed in the cushion members 45.

In this way, in the connecting portions (a total of three) of the split bodies 41, 42, 43 and 44 of the cable guide 40, the same function as the movement allowing section 30 is provided. Accordingly, in Embodiment 2, the same effect as Embodiment 1 can be exhibited. In addition, in Embodiment 2, in comparison with Embodiment 1, since portions functioning as the movement allowing section are increased by three places, a defect of the cable guide 40 can be more reliably prevented.

In addition, in the cable guide 40 of Embodiment 2, since the cushion members 45 formed of an elastic material such as rubber or the like are installed (at a total of three places) between the neighboring split bodies 41, 42, 43 and 44, wobbling of the split bodies 41, 42, 43 and 44 can be suppressed. Accordingly, in comparison with Embodiment 1, silence of the opening/closing apparatus 14 for a vehicle (see FIG. 1) can be improved regardless of an increase in the number of the split bodies.

However, all of the cushion members 45 may not be installed (at a total of three places) between the neighboring split bodies 41, 42, 43 and 44, and according to specifications of the cable guide 40, only one of the cushion members 45 may be installed or all of the cushion members 45 may be omitted.

The present disclosure is not limited to the embodiments and, of course, may be variously modified without departing from the spirit of the present disclosure. For example, while a structure in which the closing-side cable 23 and the opening-side cable 24 are connected to both sides in the longitudinal direction of the cable guides 27 and 40 installed immediately below the center rail 16, i.e., "a center driving type," has been shown in the embodiments, the present disclosure is not limited thereto. For example, the present disclosure may also be applied to a structure in which the cable guides 27 and 40 are installed in the vicinity of the lower rail 19a and the cables 23 and 24 are connected to both sides of the cable guides 27 and 40 in the longitudinal direction, i.e., a "lower driving type" opening/closing apparatus for a vehicle.

In addition, materials, shapes, dimensions, numbers, installation places, and so on of the components in the embodiments are arbitrary as long as the present disclosure can be accomplished, and are not limited to the embodiments.

It will be apparent to those skilled in the art that various modifications and variations can be made to the disclosed embodiments without departing from the scope or spirit of the disclosure. In view of the foregoing, the disclosure is intended to cover modifications and variations provided that they fall within the scope of the following claims and their equivalents.

What is claimed is:

1. An opening/closing apparatus for a vehicle configured to open and close an opening/closing body, the opening/closing apparatus for a vehicle comprising:
    a guide rail configured to movably support the opening/closing body;
    a driving apparatus installed on the opening/closing body;
    a cable guide installed along the guide rail;
    a first cable wound or let out by the driving apparatus and having a tip fixed to one side of the cable guide in a longitudinal direction of the cable guide;
    a second cable wound or let out by the driving apparatus and having a tip fixed to the other side of the cable guide in the longitudinal direction of the cable guide; and
    a cable holding groove configured in the cable guide and configured to hold the first cable and the second cable,
    wherein a cross-sectional shape of the cable holding groove in a direction crossing the longitudinal direction of the cable guide is an arc shape configured to be in surface contact with the first cable and the second cable.

2. The opening/closing apparatus for a vehicle according to claim 1, wherein the cable holding groove is recessed toward an inside of a passenger compartment.

3. The opening/closing apparatus for a vehicle according to claim 1, wherein the cable guide is formed of a resin.

4. The opening/closing apparatus for a vehicle according to claim 2, wherein the cable guide is formed of a resin.

5. The opening/closing apparatus for a vehicle according to claim 3, wherein the cable guide comprises at least two split bodies divided in the longitudinal direction of the cable guide, and a movement allowing section configured to allow approaching movement and separating movement of the split bodies is installed therebetween.

6. The opening/closing apparatus for a vehicle according to claim 5, wherein, among the split bodies that form the cable guide, the split bodies on both sides of the cable guide in the longitudinal direction of the cable guide are respectively fixed to the vehicle body.

7. The opening/closing apparatus for a vehicle according to claim 5, wherein an elastic member is installed between the split bodies that adjacent to each other.

8. The opening/closing apparatus for a vehicle according to claim 6, wherein an elastic member is installed between the split bodies that adjacent to each other.

* * * * *